United States Patent
Lewis, III

(10) Patent No.: US 10,020,652 B2
(45) Date of Patent: Jul. 10, 2018

(54) POWER DISTRIBUTION SYSTEMS

(71) Applicant: GE Energy Power Conversion Technology Ltd, Rugby, Warwickshire (GB)

(72) Inventor: Eric Lewis, III, London (GB)

(73) Assignee: GE Energy Power Conversion Technology Ltd, Rugby (GB)

( * ) Notice: Subject to any disclaimer, the term of this patent is extended or adjusted under 35 U.S.C. 154(b) by 307 days.

(21) Appl. No.: 14/683,768

(22) Filed: Apr. 10, 2015

(65) Prior Publication Data
US 2015/0295403 A1      Oct. 15, 2015

(30) Foreign Application Priority Data

Apr. 10, 2014    (EP) .................................... 14164213

(51) Int. Cl.
*H02J 3/00* (2006.01)
*H02J 1/00* (2006.01)
(Continued)

(52) U.S. Cl.
CPC ...... *H02J 1/00* (2013.01); *H02J 4/00* (2013.01); *H02M 7/04* (2013.01); *H02M 7/44* (2013.01);
(Continued)

(58) Field of Classification Search
CPC .... H02J 1/108; H02J 4/00; H02J 1/00; H02M 7/04; H02M 7/44
(Continued)

(56) References Cited

U.S. PATENT DOCUMENTS 5,790,394 A    8/1998   Cabaniss et al.
8,049,358 B2  11/2011   Crane et al.
(Continued)

FOREIGN PATENT DOCUMENTS

CN    202879782 U    4/2013
DE    19519424 A1   11/1996
(Continued)

OTHER PUBLICATIONS

Carter et al., "Conversion of the Ocean Clipper to DPS-3 classification", Oceans '99 MTS/IEEE. Riding the Crest into the 21st Century, 1999, pp. 1557-1570, vol. 3, Seattle, WA.
(Continued)

*Primary Examiner* — Thomas Skibinski
(74) *Attorney, Agent, or Firm* — GE Global Patent Operation; Scott R. Stanley

(57) ABSTRACT

A power distribution system including first and second ac busbars connected to ac generators. A first active rectifier/inverter has ac input terminals electrically connected to the first ac busbar. A second active rectifier/inverter has ac input terminals electrically connected to the second ac busbar. A first dc interface is electrically connected to dc output terminals of the first active rectifier/inverter and a second dc interface is electrically connected to dc output terminals of the second active rectifier/inverter. The dc interfaces include reverse blocking means. A third active rectifier/inverter operates as a drive and has dc input terminals electrically connected in the parallel to dc output terminals of the first and second dc interfaces by means of an interposing dc busbar. An electric motor, that can optionally form part of a marine thruster T1, is electrically connected to ac output terminals of the third active rectifier/inverter.

17 Claims, 2 Drawing Sheets

(51) Int. Cl.
*H02J 4/00* (2006.01)
*H02M 7/04* (2006.01)
*H02M 7/44* (2006.01)
*B63H 23/24* (2006.01)
*H02J 1/10* (2006.01)
*H02J 3/38* (2006.01)

(52) U.S. Cl.
CPC .............. *B63H 23/24* (2013.01); *H02J 1/108* (2013.01); *H02J 3/381* (2013.01)

(58) Field of Classification Search
USPC ........... 307/18–29, 80, 82, 84–87, 9.1, 10.1, 307/10.7, 64–68; 363/65; 322/39; 700/22; 290/4 A, 55; 320/126
See application file for complete search history.

(56) References Cited

U.S. PATENT DOCUMENTS

| | | | |
|---|---|---|---|
| 2002/0041504 A1* | 4/2002 | Steinke | ............... H02H 7/1216 363/65 |
| 2009/0156068 A1* | 6/2009 | Barrett | .................. B63H 21/20 440/3 |
| 2013/0313894 A1 | 11/2013 | Settemsdal | |

FOREIGN PATENT DOCUMENTS

| | | |
|---|---|---|
| EP | 2192681 A1 | 6/2010 |
| EP | 2451041 A1 | 5/2012 |
| EP | 2482425 A1 | 8/2012 |
| EP | 2243700 B1 | 6/2013 |
| EP | 2447149 B1 | 12/2013 |
| EP | 2709229 A1 | 3/2014 |
| WO | 2012049441 A1 | 4/2012 |
| WO | 2012059366 A3 | 11/2012 |
| WO | 2012164029 A3 | 6/2013 |
| WO | 2013072226 A3 | 10/2013 |

OTHER PUBLICATIONS

European Search Report dated Aug. 26, 2014 which was issued in connection with European Patent Application No. 14164213.2 which was filed on Apr. 10, 2014.

European Office Action issued in connection with corresponding EP Application No. 14164213.2 on Apr. 21, 2016.

* cited by examiner

POWER DISTRIBUTION SYSTEMS

BACKGROUND OF THE INVENTION

1. Technical Field

The present invention relates to power distributions systems, and in particular to marine power distribution and propulsion systems. The term "marine vessels" is intended to include ships, drilling rigs and any other surface-going vessels or platforms or submersible (submarine) vessels.

2. Background

Marine power distribution and propulsion systems are well known. In a typical arrangement a series of power converters are used to interface an ac busbar to a series of electric motors, e.g., propulsion motors or thrusters. Each power converter can be an 'active front end' (AFE) converter with an ac supply-side active rectifier/inverter (or 'front end' bridge) having ac terminals connected to the ac busbar and a motor-side active rectifier/inverter connected to the electric motor. The dc output of the ac supply-side active rectifier/inverter is connected to the dc input of the motor-side active rectifier/inverter by a dc link. A harmonic filter can be connected to the ac input terminals of each ac supply-side rectifier/inverter. In normal operation, the ac supply-side active rectifier/inverter will operate as an active rectifier to supply power to the dc link and the motor-side active rectifier/inverter will operate as an inverter to supply power to the electric motor. Reverse operation is usually possible in certain situations such as regenerative braking where the electric motor is operated as a generator and power is supplied to the ac busbar through the power converter.

Each active rectifier/inverter will typically have a conventional topology.

In some arrangements, an electric motor can be interfaced to the ac busbar by a plurality of parallel-connected power converters.

A series of prime movers (e.g., diesel engines) are connected to individual generators which supply power to the ac busbar.

The ac busbar can be equipped with protective switchgear with circuit breakers and associated controls.

The marine propulsion system will typically include a first (or port) ac busbar and a second (or starboard) ac busbar that are interconnected by a busbar tie. Some marine propulsion systems use a plurality of ac busbar sections or groups interconnected by a plurality of busbar ties to improve power availability.

Marine vessels are sometimes operated using a dynamic positioning (DP) system where the propulsion motors and/or thrusters are used to maintain the position of the vessel in the vicinity of a reference point and stabilise its heading, in opposition to environmental forces such as wind and current. The guidelines for marine vessels with DP systems are set by a number of certification authorities, for example Det Norske Veristas (DNV), and place certain requirements on the number and location (e.g., bow or stern) of propulsion motors and thrusters that must be operational during a fault situation. For example, in an arrangement with two propulsion motors located at the stern of the marine vessel and either two or three bow thrusters (e.g., tunnel thrusters), the guidelines, and in particular those relating to DNV class notation DYNPOS-AUTR, require the marine vessel to have one operational propulsion motor at the stern and either one operational bow thruster if its rating is the same as the operational propulsion motor at the stern, or two operational bow thrusters if their combined rating is the same as the operational propulsion motor at the stern.

For a marine propulsion system using three bow thrusters, to comply with the DNV class notation DYNPOS-AUTR one of the bow thrusters must be powered from two different ac busbar sections with a design that ensures that the bow thruster maintains power without any interruption if a total power loss occurs on either one of the ac busbar sections to which it is connected.

SUMMARY OF INVENTION

The present invention provides a power distribution system comprising: a first ac busbar; a second ac busbar; a first active rectifier/inverter having: ac input terminals electrically connected to the first ac busbar, and dc output terminals; a second active rectifier/inverter having: ac input terminals electrically connected to the second ac busbar, and dc output terminals; a first dc interface comprising reverse blocking means and having: dc input terminals electrically connected to the dc output terminals of the first active rectifier/inverter, and dc output terminals; a second dc interface comprising reverse blocking means and having: dc input terminals electrically connected to the dc output terminals of the second active rectifier/inverter, and dc output terminals; a third active rectifier/inverter having: dc input terminals electrically connected in the parallel to the dc output terminals of the first dc interface and the dc output terminals of the second dc interface, optionally by means of a dc busbar, and ac output terminals; and an electric motor electrically connected to the ac output terminals of the third active rectifier/inverter.

It will be noted that an electrical connection between two or more components of the power distribution system does not have to be a direct connection, and that an electrical connection can be made by, or include, interposing components.

The first and second dc interfaces can have any suitable construction and are used to maintain an electrical connection between the first and second active rectifier/inverters and the third active rectifier/inverter during a range of operating conditions.

Each dc interface can have any suitable reverse blocking means to provide automatic disconnection from either the first or second active rectifier/inverter if one of them is unable to supply power, and to prevent the propagation of a fault (e.g., a short circuit) between the first and second active rectifier/inverters. In one arrangement each reverse blocking means can include one or more diodes or other types of power semiconductor device with suitable reverse withstand voltage performance, e.g., thyristors, IGBTs, IGCTs, GTOs and IEGTs with reverse blocking action.

In one arrangement, each dc interface includes a first dc circuit line between a first dc input terminal and a first dc output terminal and a second dc circuit line between a second dc input terminal and a second dc output terminal. If each reverse blocking means comprises power semiconductor devices, a first string of one or more series-connected power semiconductor devices can be positioned in each first dc circuit line with each anode electrically connected to the first dc input terminal and each cathode electrically connected to the dc output terminal. A second string of one or more series-connected power semiconductor devices can be positioned in each second dc circuit line with each anode electrically connected to the second dc output terminal and each cathode electrically connected to the second dc input terminal. In general terms, a first part of each reverse blocking means can be positioned in each first dc circuit line to provide a reverse blocking action that permits power flow from the first dc input terminal to the first dc output terminal and prevents power flow from the first dc output terminal to the first dc input terminal, and a second part of each reverse blocking means can be positioned in each second dc circuit line to provide a reverse blocking action that permits power flow from the second dc output terminal to the second dc input terminal and prevents power flow from the second dc input terminal to the second dc output terminal or vice versa. In other words, the first and second parts of each reverse blocking means are adapted to prevent power flow in opposite directions through the first and second dc circuit lines of each dc interface. A first dc input terminal of the third active rectifier/inverter is electrically connected to the first dc output terminal of the first dc interface and the first dc output terminal of the second dc interface, optionally by means of the dc busbar. A second dc input terminal of the third active rectifier/inverter is electrically connected to the second dc output terminal of the first dc interface and the second dc output terminal of the second dc interface, optionally by means of the dc busbar.

A monitoring circuit can be provided for failure detection of the reverse blocking means. For example, a monitoring circuit can be positioned across each power semiconductor device or each string of one or more series-connected power electronic devices.

Each dc interface can also include one or more of the following components, where appropriate in each of the dc circuit lines, i.e., between one of the dc input terminals and a respective one of the dc output terminals: a dc fuse, e.g., for protection against a short circuit on the optional dc busbar, a circuit breaker, and a common mode inductor filter.

For normal operation the circuit breakers in the first and second dc interfaces must be closed so that a loss of power in either the first or second ac busbar does not result in a loss of power to the electric motor. Circuit breaker opening can be carried out when the power distribution system is to be operated using power from only one of the ac busbars, i.e., through only one of the first and second active rectifier/inverters. This mode of operation is for abnormal conditions and does not comply with the DNV class notation DYN-POS-AUTR or similar requirements.

The common mode inductor filter can optionally have a damping resistor on a coupled winding. In other words, the common mode inductor filter can have a first winding that is electrically connected to a first dc circuit line of the dc interface, a second winding that is electrically connected to a second dc circuit line of the dc interface, and a coupled winding that is electrically connected to a damping resistor. Such a common mode inductor filter will allow current to flow when the dc currents in the dc circuit lines are substantially equal and opposite. However, if there is an imbalance in the dc currents in the dc circuit lines, the common mode inductor filter will add a significant impedance to limit the possible circulating current between the first and second active rectifier/inverters.

In one arrangement, the first active rectifier/inverter can be part of a first power converter that is used to interface a second electric motor to the first ac busbar and/or the second active rectifier/inverter can be part of a second power converter that is used to interface a third electric motor to the second ac busbar. Each power converter can be an 'active front end' (AFE) converter. In particular, the first power converter can comprise the first active rectifier/inverter and a fourth active rectifier/inverter having: dc input terminals electrically connected to the dc output terminals of the first active rectifier/inverter by a dc link in parallel with the dc input terminals of the first dc interface, and ac output terminals electrically connected to the second electric motor.

The second power converter can comprise the second active rectifier/inverter and a fifth active rectifier/inverter having: dc input terminals electrically connected to the dc output terminals of the second active rectifier/inverter by a dc link in parallel with the dc input terminals of the second dc interface, and ac output terminals electrically connected to the third electric motor.

It will therefore be readily appreciated that the first dc interface is electrically connected to the dc link between the active rectifier/inverters of the first power converter and/or the second dc interface is electrically connected to the dc link between the active rectifier/inverters of the second power converter.

The second electric motor can be electrically connected to the first ac busbar by one or more additional power converters in parallel with the first power converter. Similarly, the third electric motor can be electrically connected to the second ac busbar by one or more additional power converters in parallel with the second power converter. Each additional power converter can be an AFE converter as described herein. It is expected that operation of the second and/or third electric motors at substantially rated power will require all of the parallel-connected power converters. In some situations, e.g., when the second and/or third electric motors are not being operated at rated power, the additional power converters may not be required such that the second electric motor can be operated using only the first power converter and/or the third electric motor can be operated using only the second power converter. In some other situations, the second and/or third electric motors can be operated using only the additional power converters such that the second electric motor can be isolated from the first power converter and/or the third electric motor can be isolated from the second power converter. An example might be when one or both of the first and second active power converters are being used to provide power to the first electric motor through the dc interface(s).

A contactor can be located between the first power converter and the second electric motor to selectively isolate the first dc interface from the additional power converters for the second electric motor. Similarly, a contactor can be located between the second power converter and the third electric motor to selectively isolate the second dc interface from the additional power converters for the third electric motor.

Each active rectifier/inverter employed in the power distribution system can have any suitable topology such as a two- or three-level neutral point clamped topology or a multi-level topology with a series of semiconductor power switching devices such as IGBTs, IGCTs and IEGTs fully controlled and regulated using a pulse width modulation strategy, for example.

The first and second active rectifier/inverters can include one or more of a dc output capacitor, ac-side harmonic filter and ac-side contactor for pre-charging the dc output capacitor and for starting and stopping the active rectifier/inverter.

The third active rectifier/inverter (and the optional fourth and fifth active rectifier/inverters) can include one or both of a dc input capacitor and an ac-side filter inductor.

In normal operation, the first and second active rectifier/inverters will operate as rectifiers and the third active rectifier/inverter will operate as an inverter, i.e., so that the direction of power flow is from the first and second ac busbars to the first electric motor. The power flow through each power converter that is used to interface the second and third electric motors to the ac busbars (i.e., the first and second power converters and any additional power converters) will be in the same direction during normal operation. However, the direction of power flow through each power converter can also optionally be reversed, e.g., during regenerative braking, where the second and/or third electric motors are operated as generators to supply power to the ac busbars. It is not possible to reverse the direction of power flow through the first and second dc interfaces because of the reverse blocking means that provide a reverse blocking action. If the first electric motor is required to operate as a generator, an optional dynamic braking unit can be provided as part of the power distribution system. Such a dynamic braking unit can be connected to the dc input terminals of the third rectifier/inverter in a conventional manner, for example.

The first and second ac busbars can have any suitable number of phases but three would be typical.

A busbar tie can be used to selectively connect the first and second ac busbars together.

The first and second ac busbars may be divided into individual sections. All connections to the ac busbars and between the individual busbar sections may include protective switchgear (e.g., circuit breakers) or other protective circuits for isolation purposes.

At least one ac generator will normally be electrically connected to each of the first and second ac busbars. The ac generators provide ac power to the ac busbars and have associated prime movers (e.g., turbines or diesel engines). Any suitable number of ac generators can be provided. Each ac generator may have an associated voltage controller or regulator such as an Automatic Voltage Regulator (AVR).

Each electric motor employed in the power distribution system can be of any suitable construction and type (i.e., induction, synchronous, permanent magnet etc.) and have any suitable number of phases.

The power distribution system as described herein can be a marine power distribution and propulsion system. In this case, each electric motor can be used to drive a propeller, e.g., multi-blade screw or ducted pump jet. Each electric motor can be located within the hull of the marine vessel (e.g., as an in-board propulsion motor driving a propeller via a shaft line with a stern gland), in a pod that is suspended below the hull of the marine vessel to provide both propulsion and steering, or coaxially outside the hull of a submarine, for example. Each electric motor can form part of a propulsion motor for providing the main propulsion for the marine vessel or a thruster such as a bow thruster or a stern thruster.

It will be readily appreciated that a particular marine vessel can have any suitable number and configuration of electric motors (and associated interfacing power converters) depending on its propulsion requirements.

The basic power distribution system can have different modes of operation.

For example, during normal or non-fault conditions, power can be supplied from the first and second ac busbars to the dc busbar through the first and second active rectifier/inverters and the first and second dc interfaces. In other words, the dc busbar will receive power from both the first and second ac busbars.

A control system can be used to control the power flow through the first and second active rectifier/inverters. Typically the power flow through the first and second active rectifier/inverters will be substantially the same, but the control system can also allocate different power flows depending on the circumstances. The control system can also be used to control the power flow through the third active rectifier/inverter to the first electric motor. For example, the active rectifier/inverters can be controlled to provide the required torque to keep the first electric motor at a desired rotational speed.

The busbar tie can be open or closed during normal operation. An open busbar tie is typically used for maximum power availability as it minimises the consequences due to a fault in one of the ac busbar sections. If the busbar tie is open, the ac voltages carried by the first and second ac busbars can have a different magnitude, phase or frequency which is possible due to the operation of the first and second active rectifier/inverters.

If a fault occurs on one or more of the first ac busbar, the first active rectifier/inverter and the first dc interface, the first electric motor will be automatically isolated from the first ac busbar by the reverse blocking action of the reverse blocking means in the first dc interface without the need to open the circuit breakers in the first dc interface and increased power will continue to flow to the dc busbar from the second ac busbar only. Similarly, if a fault occurs on one or more of the second ac busbar, the second active rectifier/inverter and the second dc interface, the first electric motor will be automatically isolated from the second ac busbar by the reverse blocking action of the reverse blocking means in the second dc interface and increased power will continue to flow to the dc busbar from the first ac busbar only. The automatic isolation of the first electric motor takes place without substantial delay, e.g., as a result of the instantaneous reverse blocking action of the power semiconductor devices or other reverse blocking means. Isolating the first electric motor means that it can continue to operate during a fault condition.

The arrangement of the power distribution system that includes one or more additional electric motors and interfacing power converters (e.g., the first and/or second electric motors and AFE converters) can also have different operating modes.

For example, during normal or non-fault operation, if the first electric motor does not need to be operated, the second and/or third electric motors can be operated in the usual way using the respective parallel-connected AFE converters.

If the first electric motor needs to be operated, the first dc interface can be isolated from the second electric motor and/or the second dc interface can be isolated from the third electric motor (e.g., by actuating each contactor) so that the second and/or third electric motors receive power through the additional power converters only. In other words, the second electric motor will no longer receive power through the first power converter and the third electric motor will no longer receive power through the second power converter. The first and second power converters will not normally be used to simultaneously supply power to both the second and third electric motors and the first electric motor. To operate the first electric motor, power can be supplied from the first and second ac busbars to the dc busbar through the first and second active rectifier/inverters of the first and second power converters and the first and second dc interfaces. The operation of the first electric motor during normal and fault conditions is as described above.

In the case of a marine power distribution and propulsion system, the first electric motor can be a bow thruster that is not used for marine propulsion but only for dynamic positioning (DP) when the marine vessel is substantially stationary or moving at low speed. The second and third electric motors can be propulsion motors at the stern of the marine vessel and will typically use all available AFE converters for maximum marine vessel speed, i.e., when the second and third electric motors are operating substantially at rated power.

If an additional bow thruster is connected to each of the first and second ac busbars, e.g., by means of an interfacing AFE converter, the marine power distribution and propulsion system of the present invention can comply with the strict DYNPOS-AUTR requirements. For example, if there is a fault on the second ac busbar, the marine vessel will have one operational propulsion motor at the stern (i.e., the second electric motor) and two operational bow thrusters (i.e., the first electric motor that will be receiving power from the first ac busbar through the first active rectifier/inverter and the first dc interface, and the additional bow thruster that is connected to the first ac busbar). It will be readily appreciated that due to the fault on the second ac busbar, the third electric motor and the additional bow thruster that is connected to the second ac busbar would be disabled.

DETAILED DESCRIPTION

Although the following description relates to a marine power distribution and propulsion system, it will be readily appreciated that the power distribution system of the present invention is not limited to marine applications.

Figure 1:
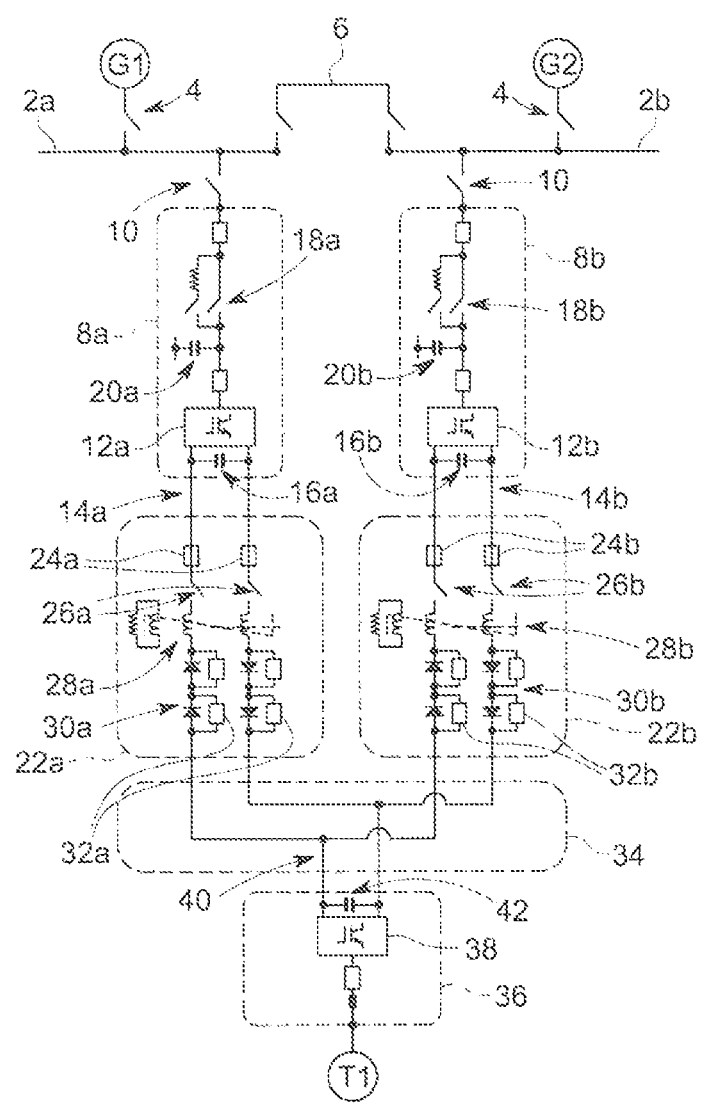
FIG. 1 is a schematic drawing showing a first marine power distribution and propulsion system according to the present invention.

A first arrangement of a marine power distribution and propulsion system according to the present invention is shown in FIG. 1. The system includes a first ac busbar 2a and a second ac busbar 2b.

An ac generator G1 is electrically connected to an associated prime mover (e.g., a diesel engine which is not shown) and supplies ac power to the first ac busbar 2a. An ac generator G2 is also electrically connected to an associated prime mover (e.g., a diesel engine which is not shown) and supplies ac power to the second ac busbar 2b. The generators G1, G2 are electrically connected to the respective ac busbar by protective switchgear 4 with circuit breakers and associated controls or other switching means. It will be readily appreciated that the system can have any suitable number of ac generators and any suitable busbar configuration depending on the power generation and distribution requirements.

The ac busbars 2a, 2b are interconnected by a busbar tie 6.

The system includes an electric motor that forms part of a thruster (e.g., a bow thruster T1) that is interfaced to the ac busbars 2a, 2b.

A first active rectifier/inverter assembly 8a is electrically connected to the first ac busbar 2a and a second active rectifier/inverter assembly 8b is electrically connected to the second ac busbar 2b. The active rectifier/inverter assemblies 8a, 8b are electrically connected to the respective ac busbars 2a, 2b by protective switchgear 10 with circuit breakers and associated controls or other switching means.

Each of the active rectifier/inverter assemblies includes an active rectifier/inverter 12a, 12b having any suitable topology such as a two- or three-level neutral point clamped topology or a multi-level topology with a series of semiconductor power switching devices such as IGBTs, IGCTs and IEGTs fully controlled and regulated using a pulse width modulation strategy, for example. The dc output terminals of each active rectifier/inverter 12a, 12b are electrically connected to a dc link 14a, 14b which includes a dc output capacitor 16a, 16b. The ac input terminals of each active rectifier/inverter 12a, 12b are electrically connected to the respective ac busbar 2a, 2b by means of a contactor 18a, 18b which can be actuated for pre-charging the dc output capacitor 16a, 16b and for starting and stopping the active rectifier/inverter. Each active rectifier/inverter assembly includes an ac-side harmonic filter 20a, 20b.

The dc link 14a, 14b of each active rectifier/inverter assembly 8a, 8b is electrically connected to a respective dc interface assembly 22a, 22b.

Each dc interface assembly 22a, 22b includes a first dc circuit line between a first dc input terminal and a first dc output terminal and a second dc circuit line between a second dc input terminal and a second dc output terminal. Each dc circuit line of the first dc interface assembly 22a includes a dc fuse 24a for protection against a short circuit on the dc busbar 34, a circuit breaker 26a, a common mode inductor filter 28a and a string of one or more series-connected diodes 30a. Similarly, each dc circuit line of the second dc interface assembly 22b includes a dc fuse 24b, a circuit breaker 26b, a common mode inductor filter 28b and a string of one or more series-connected diodes 30b. The series-connected diodes 30a, 30b in each dc interface assembly 22a, 22b automatically disconnect the respective assembly from the first or second active rectifier/inverter assembly 8a, 8b if it is unable to supply power. The automatic disconnection occurs instantaneously and is a result of the reverse blocking action of the diodes 30a, 30b. The reverse blocking action of the diodes 30a, 30b also prevents the propagation of a fault (e.g., a short circuit) between the active rectifier/inverter assemblies 8a, 8b.

Each series-connected diode 30a, 30b is connected to a monitoring circuit 32a, 32b for failure detection.

Each common mode inductor filter 28a, 28b includes a damping resistor on a coupled winding as shown in FIG. 1 and adds a significant impedance to limit the possible circulating current between the active rectifier/inverter assemblies 8a, 8b.

The dc interface assemblies 22a, 22b are connected in parallel to a common dc busbar 34. In particular, the dc busbar 34 includes a first dc circuit line that is connected to the first dc output terminal of each dc interface assembly 22a, 22b and a second dc circuit line that is connected to the second dc output terminal of each dc interface assembly.

A third active rectifier/inverter assembly 36 includes an active rectifier/inverter 38 that operates as a motor drive and has dc input terminals electrically connected to the dc busbar 34 and ac output terminals electrically connected to the electric motor of the bow thruster T1. The active rectifier/inverter 38 can have any suitable topology such as a two- or three-level neutral point clamped topology or a multi-level topology with a series of semiconductor power switching devices such as IGBTs, IGCTs and IEGTs fully controlled and regulated using a pulse width modulation strategy, for example. The dc input terminals of the active rectifier/inverter 38 are electrically connected to a dc link 40 which includes a dc input capacitor 42.

The electric motor that forms part of the bow thruster T1 can be of any suitable type and construction.

During normal or non-fault conditions, power can be supplied from the first and second ac busbars 2a, 2b to the dc busbar 34 through the first and second active rectifier/inverter assemblies 8a, 8b and the first and second dc interface assemblies 22a, 22b. In other words, the dc busbar 34 will receive power from both the first and second ac busbars 2a, 2b.

A control system (not shown) will control the power flow through the first and second active rectifier/inverter assemblies 8a, 8b. Typically the power flow through the first and second active rectifier/inverter assemblies 8a, 8b will be substantially the same, but the control system can also allocate different power flows depending on the circumstances. The control system can also be used to control the power flow through the active rectifier/inverter assembly 36 to the electric motor. The various active rectifier/inverters can be controlled to provide the required torque to keep the electric motor at a desired rotational speed so that the bow thruster T1 provides the desired thrust, e.g., for dynamic positioning (DP) of the marine vessel.

The busbar tie 6 can be open or closed during normal operation and will normally be opened during a fault condition.

If a fault occurs on one or more of the first ac busbar 2a, the first active rectifier/inverter assembly 8a and the first dc interface assembly 22a, the electric motor will be automatically isolated from the first ac busbar by the instantaneous reverse blocking action of the series-connected diodes 30a in the first dc interface assembly and increased power will continue to flow to the dc busbar 34 from the second ac busbar only or vice versa. The bow thruster T1 will therefore continue to operate during a fault condition using power supplied from the second ac busbar 2b through the second active rectifier/inverter assembly 8b, the second dc interface assembly 22b and the dc busbar 34.

Figure 2:
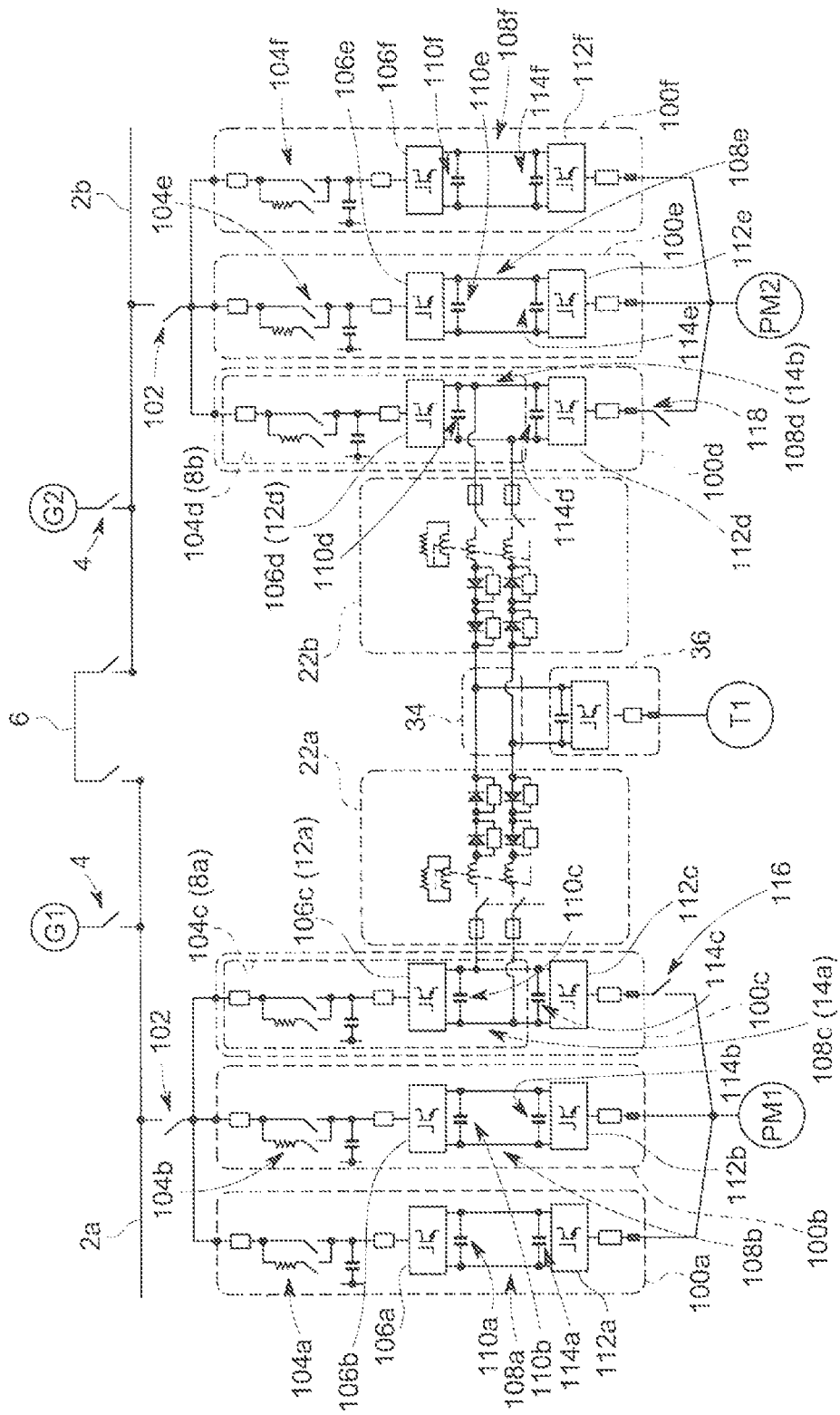
FIG. 2 is a schematic drawing showing a second marine power distribution and propulsion system according to the present invention.

A second arrangement of a marine power distribution and propulsion system according to the present invention is shown in FIG. 2. The second arrangement is similar to the first arrangement and like parts have been given the same reference signs. Where individual components in FIG. 2 have not been given reference signs, e.g., those components that form part of the first and second dc interface assemblies 22a, 22b, the active rectifier assembly 36 and some of the ac supply-side components of the first and second active rectifier/inverter assemblies 8a, 8b, it can be assumed that they are identical to the corresponding components of the first arrangement shown in FIG. 1.

In the second arrangement, the first active rectifier/inverter assembly 8a forms part of a power converter 100c that is used to interface an additional electric motor that forms part of a first stern-mounted propulsion motor PM1 to the first ac busbar 2a. The second active rectifier/inverter assembly 8b forms part of a power converter assembly 100d that is used to interface an additional electric motor that forms part of a second stern-mounted propulsion motor PM2 to the second ac busbar 2b.

The electric motor that forms part of the first propulsion motor PM1 is interfaced to the first ac busbar 2a by three parallel-connected power converter assemblies 100a, 100b and 100c. Similarly, the electric motor that forms part of the second propulsion motor PM2 is interfaced to the second ac busbar 2b by three parallel-connected power converter assemblies 100d, 100e and 100f. The power converter assemblies 100a-f are electrically connected to the respective ac busbars 2a, 2b by protective switchgear 102 with circuit breakers and associated controls or other switching means.

Each power converter assembly 100a-f includes an active rectifier/inverter assembly 104a-f identical to the active rectifier/inverter assemblies 8a, 8b described above. It will therefore be readily appreciated that each power converter assembly 100a-f is an 'active front end' (AFE) converter. The dc output terminals of each active rectifier/inverter 106a-f are electrically connected to a dc link 108a-f which includes a dc output capacitor 110a-f.

Each power converter assembly 100a-f also includes an active rectifier/inverter 112a-f that operates as a motor drive and has dc input terminals electrically connected to the dc link 108a-f and ac output terminals electrically connected to the electric motor of the respective propulsion motor PM1, PM2. Each dc link 108a-f includes a dc input capacitor 114a-f. The active rectifier/inverters 112a-f can have any suitable topology such as a two- or three-level neutral point clamped topology or a multi-level topology with a series of semiconductor power switching devices such as IGBTs, IGCTs and IEGTs fully controlled and regulated using a pulse width modulation strategy, for example.

The first dc interface assembly 22a and the active rectifier/inverter 112c for the power converter assembly 100c are both connected in parallel to the dc link 108c. Similarly, the second dc interface assembly 22b and the active rectifier/inverter 112d for the power converter assembly 100d are both connected in parallel to the dc link 108d.

Power converter assembly 100c is electrically connected to the electric motor that forms part of the first propulsion motor PM1 by a contactor 116 and the power converter assembly 100d is electrically connected to the electric motor that forms part of the second propulsion motor PM2 by a contactor 118.

Although not shown in FIG. 2, it will be readily appreciated that one or more additional electric motors, e.g., each forming part of a thruster or propulsion motor, can be interfaced to the ac busbars 2a, 2b by one or more similar power converter assemblies.

During normal or non-fault operation, and if the bow thruster T1 is not required, the first and second propulsion motors PM1, PM2 will receive power from the first and second ac busbars 2a, 2b through the power converter assemblies 100a-f in the usual way. The contactors 116, 118 will be closed.

If the bow thruster T1 is required, e.g., for DP, the contactors 116, 118 are opened and the electric motor that forms part of the bow thruster will receive power from the first and second ac busbars 2a, 2b through the active rectifier/inverter assemblies 104c, 104d of the power converter assemblies 100c, 100d. The first and second propulsion motors PM1, PM2 can also be operated, but not at full power rating, because they can still receive power from the first and second ac busbars 2a, 2b through the remaining power converter assemblies. They will not receive power through the power converter assemblies 100c, 100d.

If a fault occurs on one or more of the first ac busbar 2a, power converter assemblies 100a-c and the first dc interface assembly 22a, the electric motor that forms part of the bow thruster T1 can be isolated from the first ac busbar 2a by the instantaneous reverse blocking action of the series-connected diodes 30a in the first dc interface assembly and increased power will continue to flow to the dc busbar 34 from the second ac busbar 2b or vice versa. The bow thruster T1 will therefore continue to operate during a fault condition using power supplied from the second ac busbar 2b through the active rectifier/inverter assembly 104d of power converter assembly 100d, the second dc interface assembly 22b and the dc busbar 34. The propulsion motor that is connected to the fault-free ac busbar can also continue to operate normally.

If an additional bow thruster (not shown) is connected to each of the first and second ac busbars, e.g., by means of an interfacing AFE converter, the marine vessel can comply with DYNPOS-AUTR requirements. For example, if there is a fault on the second ac busbar 2b, the marine vessel will have one operational propulsion motor at the stern (i.e., the first propulsion motor PM1) and two operational bow thrusters, i.e., the bow thruster T1 that will be receiving power from the first ac busbar, and the additional bow thruster (not shown) that is connected to the first ac busbar.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power distribution system, comprising:
   a first ac busbar;
   a second ac busbar;
   a first active rectifier/inverter electrically connected to the first ac busbar, the first active rectifier/inverter having first dc output terminals;
   a second active rectifier/inverter electrically connected to the second ac busbar, the second active rectifier/inverter having second dc output terminals;
   a first dc interface electrically connected by a first dc link to the first dc output terminals, the first dc interface having a first reverse blocking device and third dc output terminals;
   a second dc interface electrically connected by a second dc link to the second dc output terminals, the second dc interface having a second reverse blocking device and fourth dc output terminals;
   a third active rectifier/inverter electrically connected in parallel by a third dc link to the third dc output terminals and the fourth dc output terminals, the third active rectifier/inverter having an ac output terminal; and
   an electric motor electrically connected to the ac output terminal.

2. The power distribution system according to claim 1, wherein each of the first reverse blocking devices and the second blocking device comprises a string of one or more series-connected power semiconductor devices that provide a reverse blocking action.

3. The power distribution system according to claim 1, wherein one or both of the first dc interface and the second dc interface further comprise one or more of:
   a dc fuse;
   a circuit breaker; and
   a common mode inductor filter.

4. The power distribution system according to claim 1, further comprising:
   a second electric motor electrically connected to the first ac busbar by a first power converter, the first power converter comprising:
   the first active rectifier/inverter; and
   a fourth active rectifier/inverter electrically connected to the first active rectifier/inverter by a dc link in parallel with the first dc interface, the fourth active rectifier/inverter electrically connected to the second electric motor via an ac output terminal.

5. The power distribution system according to claim 4, wherein the second electric motor is electrically connected to the first ac busbar by one or more additional power converters in parallel with the first power converter.

6. The power distribution system according to claim 4, further comprising a contactor between the first power converter and the second electric motor.

7. A power distribution system according to claim 4, further comprising:
   a third electric motor electrically connected to the second ac busbar by a second power converter, the second power converter comprising:
   the second active rectifier/inverter; and
   a fifth active rectifier/inverter electrically connected to the second active rectifier/inverter by a dc link in parallel with the second dc interface, the fifth active rectifier/inverter electrically connected to the third electric motor via an ac output terminal.

8. The power distribution system according to claim 7, wherein the third electric motor is electrically connected to the second ac busbar by one or more additional power converters in parallel with the second power converter.

9. The power distribution system according to claim 7, further comprising a contactor between the second power converter and the third electric motor.

10. The power distribution system according to claim 1, further comprising a busbar tie for selectively connecting the first and second ac busbars.

11. The power distribution system according to claim 1, further comprising at least one ac generator electrically connected to the first ac busbar and at least one ac generator electrically connected to the second ac busbar.

12. The power distribution system according to claim 1, wherein the power distribution system is a marine power distribution and propulsion system.

13. The power distribution system according to claim 1, wherein the third active rectifier/inverter is electrically connected in parallel to the third dc output terminals and the fourth dc output terminals by a dc busbar.

14. A method of operating a power distribution system, wherein the power distribution system includes:
   a first ac busbar;
   a second ac busbar;
   a first active rectifier/inverter electrically connected to the first ac busbar, the first active rectifier/inverter having first dc output terminals;
   a second active rectifier/inverter electrically connected to the second ac busbar, the second active rectifier/inverter having second dc output terminals;
   a first dc interface electrically connected to the first dc output terminals by a first dc link, the first dc interface having a first reverse blocking device and third dc output terminals;
   a second dc interface electrically connected to the second dc output terminals by a second dc link, the second dc interface having a second reverse blocking device and fourth dc output terminals;
   a third active rectifier/inverter electrically connected in parallel to the third dc output terminals and the fourth dc output terminals by a third dc link, the third active rectifier/inverter having an ac output terminal; and an electric motor electrically connected to the ac output terminal;

the method comprising:

operating the power distribution system in one of the following modes:
- a normal or non-fault mode where power is supplied to the electric motor from both the first and second ac busbars through the first and second dc interfaces and the third active rectifier/inverter; and
- a fault mode where power is supplied to the electric motor from only one of the first and second ac busbars through the respective first and second dc interface and the third active rectifier/inverter.

15. The method according to claim 14, wherein the power distribution system further includes:
- a second electric motor electrically connected to the first ac busbar by a first power converter and by one or more additional power converters in parallel with the first power converter, the first power converter having:
    - the first active rectifier/inverter; and
    - a fourth active rectifier/inverter electrically connected to the first active rectifier/inverter by a dc link in parallel with the first dc interface, the fourth active rectifier/inverter electrically connected to the second electric motor via an ac output terminal;

the method further comprising:

operating the power distribution system in one of the following modes:
- a first normal or non-fault mode where no power is supplied to the electric motor and where power is supplied to the second electric motor from the first ac busbar through the first power converter and the one or more additional power converters;
- a second normal or non-fault mode where power is supplied to the electric motor from both the first and second ac busbars through the first and second dc interfaces and the third active rectifier/inverter and where power is supplied to the second electric motor from the first ac busbar through the one or more additional power converters; and
- a fault mode where power is supplied to the electric motor from only one of the first and second ac busbars through the respective first and second dc interface and the third active rectifier/inverter.

16. The method according to claim 15, wherein the power distribution system further includes:
- a third electric motor electrically connected to the second ac busbar by a second power converter, the second power converter having:
    - the second active rectifier/inverter; and
    - a fifth active rectifier/inverter electrically connected to the second active rectifier/inverter by a dc link in parallel with the second dc interface, the fifth active rectifier/inverter electrically connected to the third electric motor via an ac output terminal;

the method further comprising:

operating the power distribution system in one of the following modes:
- a first normal or non-fault mode where no power is supplied to the electric motor and where power is supplied to the second electric motor from the first ac busbar through the first power converter and the one or more additional power converters and/or power is supplied to the third electric motor from the second ac busbar through the second power converter and the one or more additional power converters;
- a second normal or non-fault mode where power is supplied to the electric motor from both the first and second ac busbars through the first and second dc interfaces and the third active rectifier/inverter and where power is supplied to the second electric motor from the first ac busbar through the one or more additional power converters and/or power is supplied to the third electric motor from the second ac busbar through the one or more additional power converters; and
- a fault mode where power is supplied to the electric motor from only one of the first and second ac busbars through the respective first and second dc interface and the third active rectifier/inverter.

17. The method according to claim 16, wherein during a fault mode, power is supplied to whichever of the second and third electric motors is electrically connected to the only one of the first and second ac busbars through the one or more additional power converters.

* * * * *